US011983471B2

(12) United States Patent
Gambetta et al.

(10) Patent No.: US 11,983,471 B2
(45) Date of Patent: *May 14, 2024

(54) PROVIDING REUSABLE QUANTUM CIRCUIT COMPONENTS AS A CURATED SERVICE

(71) Applicant: International Business Machines Corporation, Armonk, NY (US)

(72) Inventors: Jay M. Gambetta, Yorktown Heights, NY (US); Andrew W. Cross, Yorktown Heights, NY (US); Ali Javadiabhari, Sleepy Hollow, NY (US); Dmitri Maslov, New Canaan, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/715,234

(22) Filed: Apr. 7, 2022

(65) Prior Publication Data
US 2022/0229956 A1    Jul. 21, 2022

Related U.S. Application Data

(63) Continuation of application No. 16/424,897, filed on May 29, 2019, now Pat. No. 11,314,908.

(51) Int. Cl.
*G06F 30/20* (2020.01)
*G06N 10/00* (2022.01)

(52) U.S. Cl.
CPC ............. *G06F 30/20* (2020.01); *G06N 10/00* (2019.01)

(58) Field of Classification Search
CPC ...... G06F 30/00; G06F 30/20; G06F 2111/08; G06F 30/25; G06F 2111/02; G06F 30/32; G06N 10/00
(Continued)

(56) References Cited

U.S. PATENT DOCUMENTS

| 10,592,216 | B1 * | 3/2020 | Richardson | ............. G06F 8/443 |
| 2015/0339417 | A1 * | 11/2015 | Garcia-Ramirez | ..... G06F 17/16 703/2 |
| 2017/0223094 | A1 * | 8/2017 | Johnson | ................. G06N 10/00 |

FOREIGN PATENT DOCUMENTS

WO    WO-2019217016 A1 * 11/2019    ............. G06F 30/20

OTHER PUBLICATIONS

Ahsan, Muhammad et al., "Designing a Million-Qubit Quantum Computer Using a Resource Performance Simulator", Dec. 2015, ACM Journal of Emerging Technologies in Computing Systems vol. 12, No. 4, Article 39. (Year: 2015).*

(Continued)

*Primary Examiner* — Cedric Johnson
(74) *Attorney, Agent, or Firm* — Garg Law Firm, PLLC; Rakesh Garg; Erik Johnson

(57) ABSTRACT

A repository is configured in a hybrid data processing environment comprising a classical computing system and a quantum computing system, to hold a plurality of quantum circuit components (QCC(s)). A degree of difficulty in simulating the received QCC in the classical computing system is transformed into a classical hardness score. A degree of difficulty in implementing the received QCC in the quantum computing system is transformed into a quantum hardness score. A first parameter in a metadata data structure associated with the received QCC is populated with the classical hardness score. A second parameter in the metadata data structure associated with the received QCC is populated with the quantum hardness score. The received QCC is transformed into a library element by at least augmenting the received QCC with the metadata data structure. The library element is added to the repository.

25 Claims, 6 Drawing Sheets

(58) Field of Classification Search
USPC .................................................. 703/14, 13
See application file for complete search history.

(56) References Cited

OTHER PUBLICATIONS

Booth, Kyle E.C. et al., "Comparing and Integrating Constraint Programming and Temporal Planning for Quantum Circuit Compilation", 2018, Twenty-Eighth International Conference on Automated Planning and Scheduling (ICAPS 2018), Association for the Advancement of Artificial Intelligence. (Year: 2018).*
List of all IBM related dockets, 2022.

* cited by examiner

PROVIDING REUSABLE QUANTUM CIRCUIT COMPONENTS AS A CURATED SERVICE

TECHNICAL FIELD

The present invention relates generally to a method, system, and computer program product for configuring quantum circuits. More particularly, the present invention relates to a method, system, and computer program product for providing quantum circuit components as a service.

BACKGROUND

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing uses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational operations. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor uses these quantum states of matter to output signals that are usable in data computing. Herein, a qubit is the physical carrier of quantum information. A qubit is the quantum version of a bit in classical computing, and can have quantum states of $|0\rangle$, $|1\rangle$, or the linear combination of both.

Quantum computing can often be used to solve problems more quickly than in conventional computing. For example, one quantum algorithm is Grover's Search, which accomplishes searching through an unordered list of N items with fewer lookups than is the case in conventional computing.

Quantum gates are the elementary building blocks for quantum computation, acting on qubits the way classical logic gates act on bits, one and two at a time, to change qubit states in a controllable way. An X gate inverts the state of a single qubit, much like a NOT gate inverts the state of a single bit in classical computing. An H gate, or Hadamard gate, puts a single qubit into a state of superposition, a combination of the 0 and 1 quantum states. The qubit only resolves to a definite state when measured. For example, when provided with an input having a quantum state of 0, within the Hadamard gate the quantum state is in superposition, but the output has a 50 percent probability of being in the quantum 0 state and a 50 percent probability of being in the quantum 1 state. Other single-qubit gates alter the qubit state in other defined ways.

Multi-qubit gates implement gates that perform conditional logic between qubits, meaning the state of one qubit depends on the state of another. For example, a Controlled-NOT, or CNOT gate, has two qubits, a target qubit and a control qubit. If the control qubit is in the 1 quantum state, the CNOT gate inverts the state of the target qubit. If the control qubit is in the 0 quantum state, the CNOT gate does not change the state of the target qubit.

Multiple qubits can also be entangled. Two or more qubits are entangled when, despite being too far apart to influence one another, they behave in ways that are individually random, but also too strongly correlated to be explained by supposing that each object is independent from the other. As a result, the combined properties of an entangled multi-qubit system can be predicted, but the individual outcome of measuring each individual qubit in such a system cannot.

Similar to conventional computing, quantum computing gates can be assembled into larger groups, called quantum circuits, to perform more complicated operations. For example, a SWAP gate, which exchanges the states of a pair of qubits, can be constructed from three CNOT gates.

Quantum circuits can perform some operations in parallel, and some in series. The length of the longest series in the program is also referred to as the depth of the quantum circuit. For example, the three CNOT gates comprising a SWAP gate are arranged in series, giving a depth of 3. Programs with a shallower depth take less execution time and provide better performance, so are preferred.

Conventional computers do not have to be hand-programmed with specific instruction steps, such as those provided in processor-specific assembly languages. Instead, programmers write hardware-independent code in a higher-level language, and a compiler translates this code into assembly language for execution on a specific processor. Similarly, in quantum computing programmers do not have to specify individual gates. Instead, programmers can write higher-level code in a higher-level language. A compiler parses this code and maps it into a quantum circuit. Finally, a quantum processor executes the quantum circuit.

The illustrative embodiments recognize that a need exists for a curated library of quantum circuit components (QCC, plural QCCs) from which quantum circuits (QCs) can be constructed for use in solving problems in areas such as chemistry, artificial intelligence, and optimization. While collections of reusable QCCs do exist, for a QCC to be useful in a given QC requirement requires more than mere availability of the QCC. The illustrative embodiments recognize that many characteristics of a QCC have to be considered before the QCC can be selected for use in a QC being configured. The illustrative embodiments recognize that for a QCC to be readily and reliably reusable, such characteristics of the QCC have to be computed and associated, e.g., as metadata, with the QCC. The QCC with the associated metadata can then be entered as a curated library element in a library of QCCs.

Curating is the process of organizing and presenting objects with professional knowledge. The curation of the library of QCCs, as contemplated by the illustrative embodiments, comprises knowledge creation about the QCCs with a non-trivial complex and dynamic computational process which is performed using a classical data processing environment, a quantum data processing environment, or a hybrid quantum-classical data processing environment.

Quantum Circuits as a Service (QCaaS) comprises a method and system for providing reusable QCCs as elements of a curated library. The illustrative embodiments further recognize that QCaaS is a valuable service in quantum computing for a number of reasons. For example, a QCC provided from the contemplated QCaaS serves to not only reduce classical computation time needed to compile a QC, in many cases it is quite likely that the curated QCC is better optimized than a QCC that a particular QC compiling tool is capable of producing. It is also highly likely that while a particular QC may be only configured once to solve a particular problem, the QCC may be usable across a variety of QCs and to solve a variety of problems. Therefore, different quantum computing exercises may configure, simulate, and test the same functionality in different manifestations of the QCC. These exercises can result in a set of QCCs that essentially perform similar functions or operations, but exhibit different configurations, different degrees of difficulty in simulating the QCC in a classical data processing environment (classical hardness score), different degrees of complexity in implementing the QCC in a quantum data processing environment (quantum hardness score), or some combination thereof. As described herein, a curated QCC—a library element—can include numerous other metadata parameters beyond these examples, rendering the QCC more or less suitable in an informed selection process for a QC design.

SUMMARY

The illustrative embodiments provide a method, system, and computer program product. An embodiment includes a method that configures, in a hybrid data processing environment comprising a classical computing system and a quantum computing system, a repository to hold a plurality of quantum circuit components (QCC(s)). The embodiment transforms into a classical hardness score, for a received QCC, a degree of difficulty in simulating the received QCC in the classical computing system. The embodiment transforms into a quantum hardness score, for the received QCC, a degree of difficulty in implementing the received QCC in the quantum computing system. The embodiment populates a first parameter in a metadata data structure associated with the received QCC, the classical hardness score corresponding to the received QCC. The embodiment populates a second parameter in the metadata data structure associated with the received QCC, the quantum hardness score corresponding to the received QCC. The embodiment transforms the received QCC into a library element, wherein the transforming comprises at least augmenting the received QCC with the metadata data structure. The embodiment adds the library element to the repository. Thus, the embodiment enables providing QCCs via QCaaS.

Another embodiment further simulates the received QCC in the classical computing system, the simulating producing the degree of difficulty in simulating the received QCC. Thus, the embodiment enables providing QCCs via the QCaaS with the information that is useful in selecting and reusing the QCC from the QCaaS.

Another embodiment further receives a QC. The embodiment partitions the QC into a set of QCCs, the received QCC being a member of the set of QCCs. Thus, the embodiment enables serving entire QC or portions thereof as QCCs via the QCaaS.

Another embodiment further receives descriptive information in conjunction with the QC, the descriptive information comprising a contributor's degree of difficulty in simulating the QC in a contributor's classical system, and wherein the contributor's degree of difficulty is used as the degree of difficulty in simulating the received QCC in the classical computing system. Thus, the embodiment enables providing QCCs via the QCaaS with the original contributor's information that is useful in selecting and reusing the QCC from the QCaaS.

Another embodiment further receives descriptive information in conjunction with the QC, the descriptive information comprising a contributor's degree of difficulty in simulating the QC in a contributor's classical system; validating the contributor's degree of difficulty by simulating the QCC in the classical computing system, and wherein the degree of difficulty in simulating the received QCC in the classical computing system overrides the contributor's degree of difficulty. Thus, the embodiment enables providing QCCs via the QCaaS with validation and update of contributor-provided information that is useful in selecting and reusing the QCC from the QCaaS.

Another embodiment further receives descriptive information in conjunction with the QC, the descriptive information comprising a contributor's degree of difficulty in implementing the QC in a contributor's quantum system, and wherein the contributor's degree of difficulty is used as the degree of difficulty in implementing the received QCC in the quantum computing system. Thus, the embodiment enables providing QCCs via the QCaaS with the contributor's information that is useful in selecting and reusing the QCC from the QCaaS.

Another embodiment further receives descriptive information in conjunction with the QC, the descriptive information comprising a contributor's degree of difficulty in implementing the QC in a contributor's quantum system; validating the contributor's degree of difficulty by implementing the QCC in the quantum computing system, and wherein the degree of difficulty in implementing the received QCC in the quantum computing system overrides the contributor's degree of difficulty. Thus, the embodiment enables providing QCCs via the QCaaS with validation and update of contributor-provided the information that is useful in selecting and reusing the QCC from the QCaaS.

Another embodiment further implements the received QCC in the quantum computing system, the implementing producing the degree of difficulty in implementing the received QCC. Thus, the embodiment enables measuring a metadata parameter of the QCC that is useful in selecting and reusing the QCC from the QCaaS.

Another embodiment further associates with the received QCC, the metadata data structure, the metadata data structure comprising a plurality of parameters, the plurality of parameters including the first parameter and the second parameter. Thus, the embodiment prepares a portion of the information that enables a QCC for participation in the QCaaS.

In another embodiment, the metadata data structure comprises a plurality of instances of a third parameter, each instance of the third parameter being a new data structure. Thus, the embodiment prepares a portion of the information that enables a QCC for participation in the QCaaS.

In another embodiment, the metadata data structure further comprises a third parameter, a value of the third parameter describing a computational functionality implemented by the received QCC. Thus, the embodiment prepares a portion of the information that enables a QCC for participation in the QCaaS.

In another embodiment, the computational functionality is described as a graph, the value of the third parameter comprising a set of vertices and angles between pairs of vertices. Thus, the embodiment prepares a portion of the information that enables a QCC for participation in the QCaaS.

In another embodiment, the metadata data structure further comprises a third parameter, a value of the third parameter comprising a circuit specification of the received QCC. Thus, the embodiment prepares a portion of the information that enables a QCC for participation in the QCaaS.

In another embodiment, the circuit specification is specified in a quantum assembly language (QASM). Thus, the embodiment prepares a portion of the information that enables a QCC for participation in the QCaaS.

In another embodiment, the metadata data structure further comprises a third parameter, a value of the third parameter comprising a figure of merit of the received QCC. Thus, the embodiment prepares a portion of the information that enables a QCC for participation in the QCaaS.

In another embodiment, the figure of merit is a gate count of the received QCC. Thus, the embodiment prepares a portion of the information that enables a QCC for participation in the QCaaS.

In another embodiment, the figure of merit comprises an expected gate count at runtime of the received QCC. Thus, the embodiment prepares a portion of the information that enables a QCC for participation in the QCaaS.

In another embodiment, the figure of merit is a circuit depth of the received QCC. Thus, the embodiment prepares a portion of the information that enables a QCC for participation in the QCaaS.

In another embodiment, the figure of merit an expected circuit depth at runtime of the received QCC. Thus, the embodiment prepares a portion of the information that enables a QCC for participation in the QCaaS.

Another embodiment further optimizes the received QCC, as a part of transforming the received QCC, to form an optimized QCC, wherein the library element comprises the optimized QCC and the metadata structure, wherein the classical hardness score corresponding to the received QCC is a classical hardness score corresponding to the optimized QCC, and wherein the classical hardness score corresponding to the received QCC is a classical hardness score corresponding to the optimized QCC. Thus, the embodiment prepares a QCC for participation in the QCaaS.

In another embodiment, the adding causes one operation from a set of operations, the set of operations comprising (i) an older version of the library element is deleted, (ii) the older version of the library element is overwritten, and (iii) the older version of the library element is preserved and the library element is added as a new version of the older library element. Thus, the embodiment manages a library of QCCs for participation in the QCaaS.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
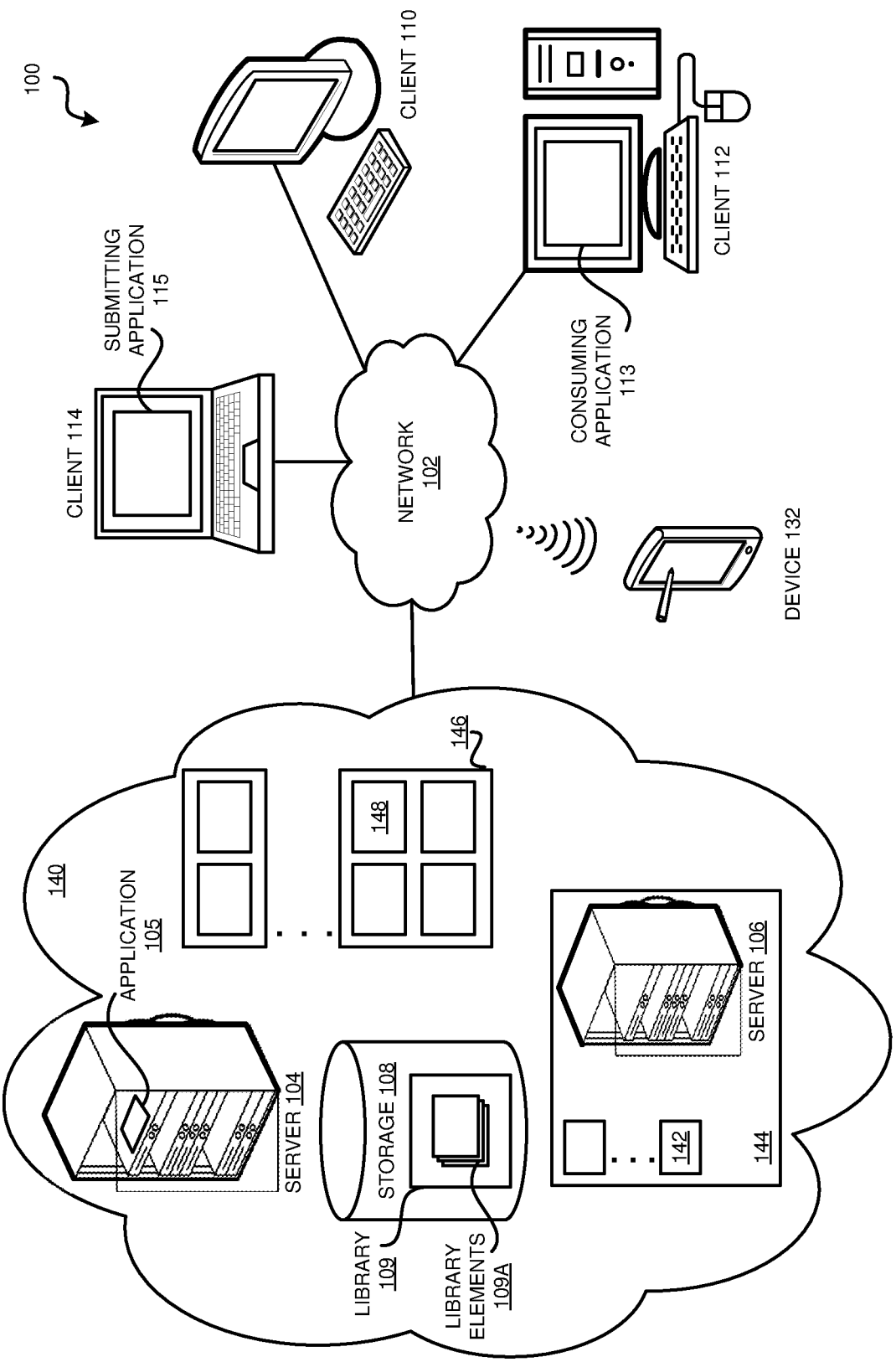
FIG. 1 depicts a block diagram of a network of data processing systems in which illustrative embodiments may be implemented.

The illustrative embodiments recognize that in many cases, the quantum circuit produced by a compiler is not necessarily the most efficient quantum circuit capable of producing the same result. The illustrative embodiments further recognize that in many cases, an entire problem or at least a portion of the problem sought to be solved using quantum computing has been solved previously. One or more previous solutions yield one or more QCCs that are reusable when the same or similar problem, or even a different problem, is to be configured as a QC.

Furthermore, the illustrative embodiments recognize that even for the same problem or sub-problem, a particular QCC may be—optimal at one time and not at another, optimal under one set of circumstances and not at another, or generally vary non-deterministically based on several factors. Just as optimizing compilers optimize compiled code for conventional processors, so too a transpiler is needed to optimize quantum circuits meant to run on quantum processors. As used herein, transpilation refers to transforming a quantum circuit into another quantum circuit that produces the same outputs from the same inputs as does the original quantum circuit. Optimizing refers to refining a quantum circuit so that its execution incurs lower cost, typically by taking less time to execute, better accuracy—e.g., by using a configuration of different or fewer qubits to minimize interference or decoherence, or some combination thereof.

Compiler optimizations for classical programs, such as classical dataflow based optimizations and stochastic optimizations, do not apply to quantum circuits because outputs from the two types of programs differ. For classical programs, the program state is deterministic and the output is simply the program state when execution completes. For quantum circuits, the program state represents a probability distribution of all possible outcomes, and the output is merely a sample from the distribution. As a result, outputs change from run to run non-deterministically.

Existing techniques for optimizing quantum circuits follow ad-hoc heuristics, relying on correctness-preserving rules or templates specified by human experts. However, such ad-hoc heuristics are simply methods that have been successful, more times than not, in optimizing quantum circuits in the past. Such methods are not guaranteed to be equally successful in optimizing quantum circuits in the future.

The illustrative embodiments also recognize that a compiler often produces a generic quantum circuit. Such a generic quantum circuit is not specific to a particular quantum processor configuration. Each quantum processor, although having the same hardware configuration (e.g. having the same number of qubits), can have varying properties. Such properties, such as how long a qubit can remain in a particular quantum state before decaying to another quantum state, how long a qubit can remain in a superimposed state before decaying to a particular quantum state, the frequency of a particular qubit, gate error (i.e. the rate at which a quantum gate or operation gives an incorrect result), and the like, change over time. Quantum processors require periodic calibration to account for this variability. Thus, the illustrative embodiments recognize that such calibration results can affect the performance of a quantum circuit.

The illustrative embodiments also recognize that a provider may want to modularize quantum circuit optimizations. Quantum computing is a rapidly evolving field. Modularization allows for reuse of QCCs and will be improved when a curated library of known, reliable, optimized, and well parameterized QCCs is made available by the illustrative embodiments. The parameters specified in the metadata of a curated QCC, as described herein, enable ease of adaptation of the intended QC to additional quantum processor configurations, such as processors with additional qubits or qubit coupling options. The QC optimization is an evolving field of endeavor. The QCC library contemplated herein also allows for updating the library elements with updated metadata, QCC configuration, or both, when additional, new, or different optimization techniques are applied by contributing quantum programmers. As well, the QCC library of the illustrative embodiments also allows a re-user of a library element to control, change, or otherwise manipulate the computing environment according to the metadata of the selected QCC in an informed manner.

As a result, what is needed in the art of constructing and optimizing QCs is a technique for augmenting a QCC with a set of metadata parameters so that the QCC can participate as a library element in a curated library of QCCs. The library and the elements in the library can be selected and reused according to a suitability determination made using the QCCs' metadata.

The illustrative embodiments recognize that the presently available tools or solutions do not address these needs or provide adequate solutions for these needs. The illustrative embodiments used to describe the invention generally address and solve the above-described problems and other problems related to modular quantum circuit optimization.

An embodiment can be implemented as a software application operating in conjunction with a classical-only or quantum-classical hybrid data processing environment. An implementation of the software application portion of an embodiment, or one or more components thereof, can be configured as a modification of an existing classical portion of a hybrid quantum-classical processing environment, as a separate classical computing application that operates in conjunction with an existing hybrid quantum-classical processing environment, as a standalone application, or some combination thereof.

An embodiment configures a hybrid data processing environment including a classical computing environment and a quantum computing environment. In accordance with the illustrative embodiments, the environment includes at least one quantum compute node (QCN), and at least one conventional node (CN) on which an embodiment can execute. Such a computing environment is hereinafter referred to as a quantum computing environment (QCE). The QCE may include one or more CNs in a suitable configuration—such as a cluster—to execute applications using conventional binary computing. The hybrid environment can be implemented using cloud computing architecture.

Particularly, some illustrative embodiments provide a method by which a set of QCCs are analyzed, evaluated, parameterized, and associated with new metadata. The QCCs with their respective metadata parameters are curated in a repository of QCCs, in which a search for QCCs can be performed given one or more requirements of a QC that is to be constructed. A QCC in the contemplated repository may be constructed or created by a compiler operating within the repository's data processing environment, contributed by an external entity—such as a compiler used by a quantum programmer in an unrelated data processing environment, or some combination thereof. A QCC in the repository can be updated in a similar manner—from data produced within the repository's data processing environment or from data produced outside the repository's data processing environment.

An embodiment constructs a data structure comprising a plurality of parameters. The data structure forms the metadata of a QCC when populated with QCC-specific parameters as described herein. Each parameter is configured as a data structure to hold one or more values of one or more types. The embodiment configures a parameter in the metadata to hold a QCC-specific value, and different parameters are configured to hold different values indicative of different characteristics of the subject QCC. Some non-limiting examples of the parameters contemplated in the metadata are as follows—

Logical or computational functionality parameter: An embodiment configures this parameter to hold a technical description of a function or operation implemented in the subject QCC. The parameter value can take any suitable form, including but not limited to unstructured textual data, structured data according to a specific syntax or logic description language, or a combination thereof. For example, in one embodiment, this parameter provides the theoretical description of the function that is implemented in the QCC. In another example embodiment, this parameter holds data descriptive of a structure of the circuit family, which is described as a graph comprising a set of vertices and connections between vertices, for example a directed acrylic graph (DAG). In the graph representation, this parameter also provides measurement data, e.g., a set of angles between the connections. A graph includes a collection of edges connecting pairs of vertices. In a directed graph, each edge has an orientation, from one vertex to another. And in a directed acrylic graph, there are no paths, along edges from one vertex to another, that loop back to a starting vertex.

In the DAG format, the data of this parameter models each input qubit as a starting vertex, and models each output qubit as an ending vertex. Between starting and ending vertices, the data of this parameter models operations on qubits as vertices. Just as a wire, representing a qubit, connects one gate to another in a quantum circuit representation, a graph edge, representing a qubit, connects one vertex to another in a DAG representation of the quantum circuit. Using such a DAG format in this parameter, dataflow and dependencies between elements are explicit, and thus easier to manipulate than a circuit or text representation of a quantum circuit. However, the parameter need not be configured to use a graph format, or any particular graph format, and other quantum circuit representations are contemplated within the scope of the illustrative embodiments.

In another embodiment, this parameter can be configured to hold non-essential information about the QCC as well, e.g., a reason or description of why the particular QCC is interesting, the QCC's history, or external references related to the implemented function, literature, or source of the QCC. Yet another embodiment configures this parameter to hold guidance information about various simulation scenarios for the QCC. Another embodiment configures this parameter to provide guidance on how to analyze or post-process the data output of the QCC, how to preprocess one or more inputs to the QCC, and the like. An embodiment can configure this parameter to hold a combination of these and other similarly purposed data without departing the scope of the illustrative embodiments.

Circuit specification: An embodiment configures this parameter to hold a formalized circuit specification, in a circuit specification language or format. In one embodiment, this parameter holds a circuit layout or drawing. In another embodiment, this parameter holds a specification of the QCC in quantum assembly language (QASM) or a similarly purposed language or format. As an example, using this parameter, a re-user of the QCC can find out how the QCC is represented, which operation is performed in the circuit, a problem or sub-problem the circuit computes, a number of qubits needed to implement the QCC, num free parameters the QCC uses (these are different parameters from the parameters in the metadata), and the like.

Figures of merit: This parameter can be a singular parameter or a plurality of parameters depending on how many figures of merit are populated in the metadata. One example figure of merit is a gate count. In one embodiment, the gate count is further categorized or sub-parameterized by gate type. In another embodiment, the gate count is a weighted count. In another embodiment, the gate count is an expected number of gates involved in the circuit in the case of runtime-dependent computations. Another example figure of merit is the QCC's circuit depth. Again, in one embodiment, the circuit depth is sub-divided by gate types, and in another embodiment the circuit depth is an expected depth in the case of runtime-dependent computations. The value or values in this parameter are changeable or dependent on how the circuit of the QCC is drafted in the specification—quantum algorithms can be written down in several forms, making gate counting a difficult problem because, for example, interacting pairs of qubits inside most quantum computers will require moving qubits, which in many architectures, involves cellular automaton-like swapping of qubits. In general, the depth will be described in number of quantum error correction (QEC) cycles, while the total cost will be space-time "volume" consisting of the number of qubits involved over that set of QEC cycles. This implies that accurate estimates can be made only in the context of a particular architecture and error correction mechanism), number and type (dirty/clean) of ancillae, connectivity pattern allowing direct (no SWAPping involved) execution of the circuit, number of measurements and feed-forward operations used, approximation error (in cases when the desired transformation is implemented approximately), cost metric defined to reflect the error in the computation given by a certain error model.

Classical hardness score: An embodiment configures this parameter to hold a value (or a set of values) that is indicative of a degree of difficulty in simulating the QCC's computation in a classical data processing environment. Generally, if the QCC can be simulated relatively easily (i.e., with a lower than a threshold classical hardness score), then implementing the QCC is not very useful because the computation can be readily performed in classical computers. Conversely, if the QCC cannot be simulated relatively easily (i.e., with a threshold or higher classical hardness score), then implementing the QCC is deemed to be useful because the computation cannot be readily performed in classical computers. In one embodiment, the classical hardness score comprises a classical state vector or an equivalent representation of simulation runtime using a preferred classical simulator, e.g., the best classical simulator known at the time for that type of QCC. In one embodiment, the parameter's value—the runtime number is obtained by applying the simulator(s) to random computational basis states and is stored in the parameter as a combination of the runtime expectation value and standard deviation. In another embodiment, this parameter also includes information on the classical hardware used to achieve the advertised runtime of the classical hardness score.

When the classical hardness score is computed using a preferred simulator, the classical hardness score can and will change as new and better performing simulators are introduced over time. An embodiment revises the classical hardness score as and when a contributor reports a change in the classical hardness score based on the simulation used. Similarly, algorithms to solve a particular problem with quantum computing also evolve with time. If a new algorithm is found—either by an external contributor or by a contributor in the data processing environment of the library, the hardness of the solution, e.g., the classical hardness score of a quantum circuit that solves the problem, might improve (reduce) relative to a previous classical hardness score of a quantum circuit corresponding to a previous solution. Thus, with the evolution or improvement of the algorithms to solve quantum computing-suitable problems, an embodiment revises or improves the classical hardness score of a QCC in the library. In one embodiment, a classical hardness score improvement or revision is subjected to verification as described herein, before a QCC in the library is updated with that improved or revised score.

A quantum hardness score: this parameter stores a value or a set of values describing the experimentally measured fidelity and other relevant indicators that are indicative of a degree of difficulty in executing the QCC on quantum hardware. A quantum hardness score of a quantum circuit depends on now only the configuration of the quantum hardware for executing the circuit but also on the optimizations and other compilation operations that make a particular quantum circuit compatible with the given quantum computing hardware. Since quantum hardware may not always be available via public means, the quantum score can be a figure claimed by a particular quantum computing facility, in which case the quantum computing facility is also specified in this parameter.

Quantum computing resources are not ubiquitously available at the moment and the available configurations are limited in the amount and types of quantum computing resources (e.g., q-processors, qubit configurations, etc.). With time, it is reasonable to expect the availability of quantum computing resources to improve, much in the way classical computing resources are now ubiquitously available. Thus, the difficulty in implementing a quantum circuit with the then-available quantum computing resources is also expected to improve (reduce) over time. As new quantum computing resources and configurations become available— either to an external contributor or to a contributor in the data processing environment of the library, the hardness of the solution, e.g., the quantum hardness score of a quantum circuit that solves the problem, might improve (reduce) relative to a previous quantum hardness score of a quantum circuit corresponding to a previous solution. Thus, with the evolution or improvement of the quantum computing resources to solve quantum computing-suitable problems, an embodiment revises or improves the quantum hardness score of a QCC in the library. In one embodiment, a quantum hardness score improvement or revision is subjected to verification as described herein, before a QCC in the library is updated with that improved or revised score.

These examples of metadata parameters are not intended to be limiting. From this disclosure, those of ordinary skill in the art will be able to conceive many other metadata parameters and the same are contemplated within the scope of the illustrative embodiments.

An embodiment may receive a QCC from an external contributor. In such a case, if the QCC is delivered with any information that is mappable to the metadata as described herein, the embodiment validates the supplied information. For example, if the contributor provides an execution time on a specific classical hardware, the embodiment validates the execution time in a similarly configured classical hardware in the embodiment's data processing environment. As another example, if the contributor provides an implementation on a specific quantum hardware, the embodiment validates the degree of implementational difficulty in the same quantum hardware or a similarly configured quantum hardware in the embodiment's data processing environment. A specification supplied by the contributor can be validated using the same or different specification tool in the embodiment's data processing environment. From this disclosure, those of ordinary skill in the art will be able to determine similar methods for validating other information for mapping to the metadata and such other methods are contemplated within the scope of the illustrative embodiments.

An embodiment may only receive a QCC from an external contributor without any usable accompanying information, or the embodiment may obtain the QCC within the embodiment's data processing environment. The embodiment computes the metadata parameters in such cases by simulating the QCC (and performing other operations) in the embodiment's classical or hybrid data processing environment.

When a QCC already exists in the curated repository of an embodiment, and the embodiment receives the same QCC or the same type of QCC with different information or metadata, the embodiment evaluates the different information or metadata. If the different information or metadata indicates an improvement over the metadata of the already stored QCC, the embodiment revises or updates the stored QCC, in a manner described herein. One embodiment leaves the existing QCC library element as-is in the library and constructs a separate new version of the QCC with the different information or metadata.

The illustrative embodiments curate and maintain a repository or library of QCC and associated metadata in this manner. An embodiment provides library elements for reuse in response to requests for reusable QCCs. As an example, the embodiment receives a QC requirement in a request. The QC requirement specifies an operation, a function, an algorithm, or a portion thereof, that is to be implemented in a QC. The embodiment parses, transforms, or otherwise analyzes the QC requirement to determine a correspondence between the requirement and one or more types of metadata parameters available in the library. Using the values specified in the requirement, the embodiment matches, within specified tolerance(s), a value from the requirement to a value in the metadata of one or more library elements. The embodiment outputs or recommends those library elements that are suitably matched with the requirement within the specified tolerances.

One embodiment further computes a price for re-using a recommended library element. For example, an embodiment may configure a parameter in the metadata of a QCC to hold a pricing value or a pricing formula, using which the QCC can be priced when selected for reuse. Once a recommended library element is selected for reuse (and the associated financial transaction, if any, has been successfully completed), an embodiment delivers the library element in response to the request. The delivery includes the QCC as well as some or all parameters from the QCC's metadata. In one embodiment, the delivered QCC is accompanied by only some but not all parameters. For example, the classical and quantum hardness scores may be delivered but not the pricing information. As another example, the QCC may be delivered with the specification converted from one specification format or language to another specification format or language. As another example, the QCC may be delivered with execution and performance data related to execution or simulation on a proprietary system removed from the metadata.

These examples of modifying the metadata parameters at delivery are not intended to be limiting. From this disclosure, those of ordinary skill in the art will be able to conceive many other ways in which the delivered metadata can be changed from the metadata stored in the library and the same are contemplated within the scope of the illustrative embodiments.

The manner of curating parameterized QCCs described herein is unavailable in the presently available methods. A method of an embodiment described herein, when implemented to execute on a device or data processing system, comprises substantial advancement of the functionality of a quantum circuit designing tool by searching a curated repository of reusable QCCs and reusing a selected pre-optimized QCC that allows for rapid QC construction and optimization for a particular problem-solving exercise in a particular quantum data processing environment.

The illustrative embodiments are described with respect to certain types of quantum circuits, quantum gates, qubits, quantum processors, parameters, metadata, data structures, QCCs, QC requirements, library or repository structures, figures of merit, hardness scores and scoring methodologies, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, operations, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
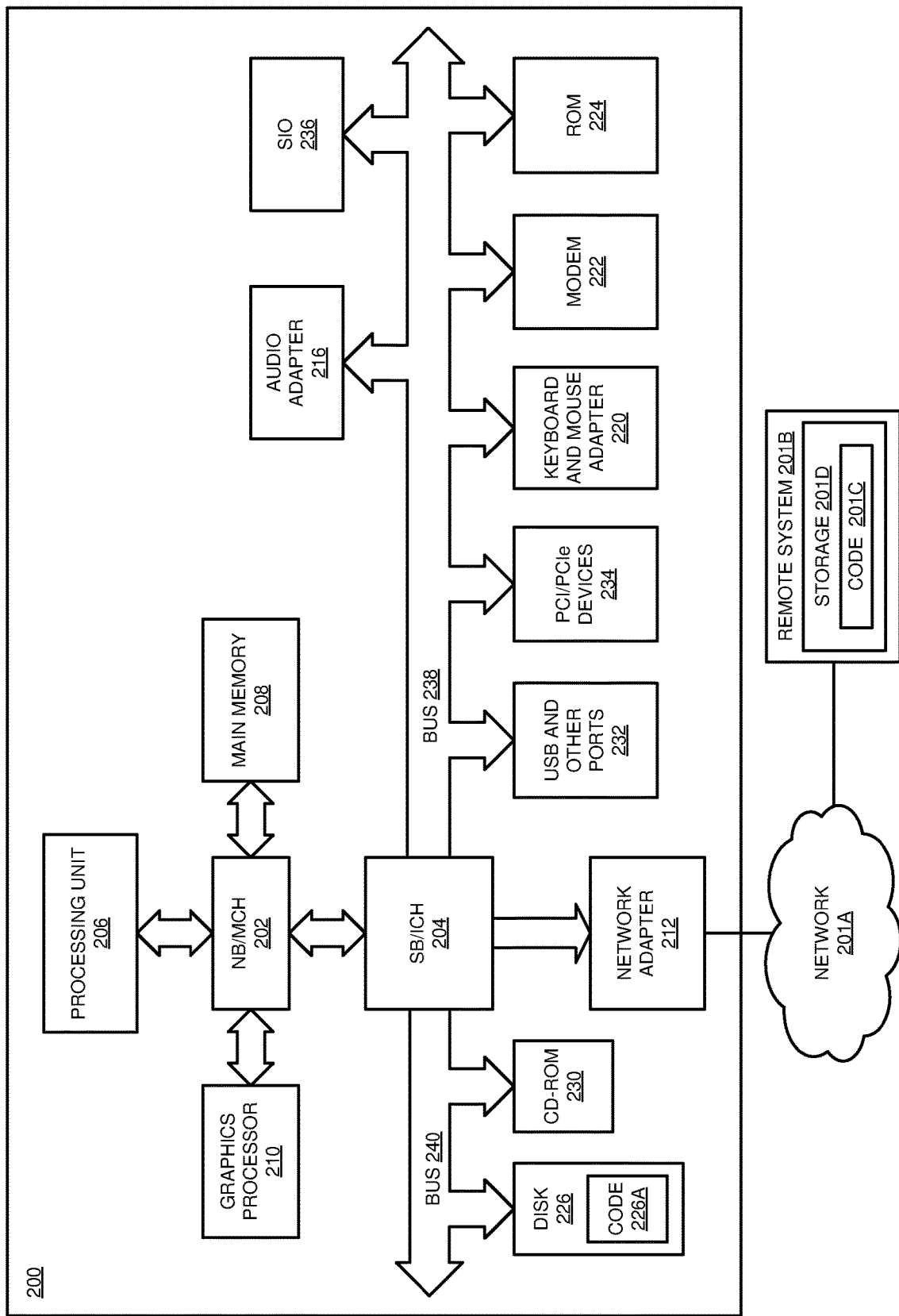
FIG. 2 depicts a block diagram of a conventional data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

QCE 140 is an example of a QCE described herein. As an example, QCE 140 includes CN 104, 106, and many other similar CNs 142. As an example, CNs 106 and 142 may be configured as cluster 144 of CNs. QCE 140 further includes one or more QCNs, such as QCN 146. A QCN, such as QCN 146, comprises one or more q-processors 148. A currently viable qubit is an example of q-processor 148. Application 105 implements an embodiment described herein. Application 105 operates on a CN, such as server 104 in QCE 140. Application 105 stores and curates library elements 109A in library 109 in storage 108, or in any other suitable storage. As a non-limiting example, submitting application 115 may contribute a QCC that is transformed into an instance of library element 109A, and consumer application 113 may search library 109 to find and reuse the QCC from that instance of library element 109A.

QCE 140 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 as a whole may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a conventional data processing system in which illustrative embodiments may be implemented. Data processing system 200 is an example of a classical computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as server 104 in FIG. 1 in which computer usable program code or instructions implementing the processes of the illustrative embodiments may be located. Data processing system 200 is described as a computer only as an example, without being limited thereto. Implementations in the form of other devices, such as server 104 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. In some illustrative examples, data processing system 200 may be a mobile device.

A communications unit may include one or more devices used to transmit and receive data, such as a modem or a network adapter. A memory may be, for example, main memory 208 or a cache. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device. Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. The host data processing system in such cases is represented by data processing system 200.

Figure 3:
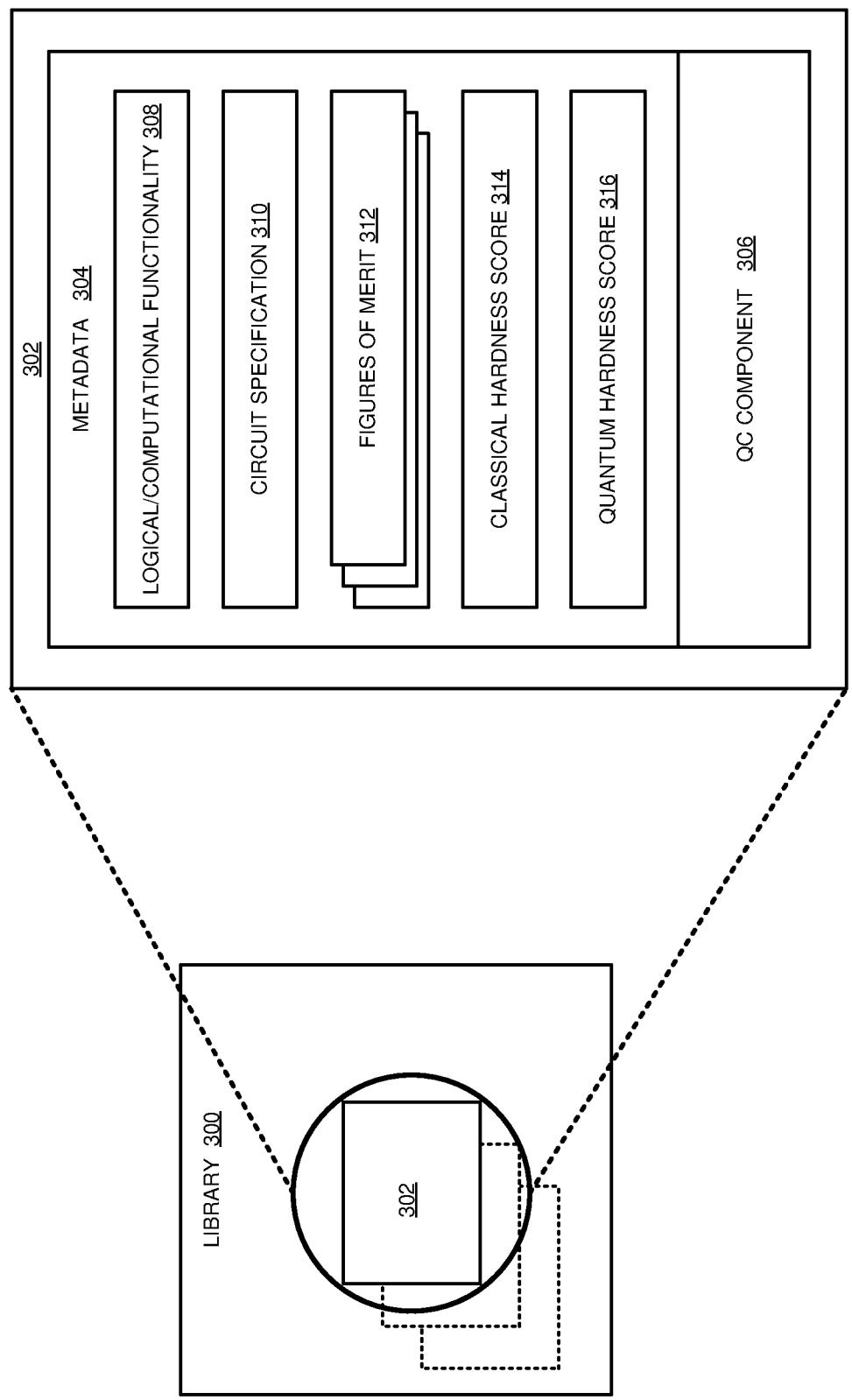
FIG. 3 depicts a block diagram of an example configuration of a library element in accordance with an illustrative embodiment.

With reference to FIG. 3, this figure depicts a block diagram of an example configuration of a library element in accordance with an illustrative embodiment. Library 300 is an example of library 109 in FIG. 1, and can be implemented as a repository of any suitable form so long as configurable to hold a plurality of library elements, such as library element 302. Library element 302 is a non-limiting example of library element 109A in FIG. 1.

Library element 302 comprises metadata 304 and QCC 306. QCC 306 may be as received from a contributor, e.g., from submitting application 115 in FIG. 1, or may be a transformed form of a contributed QCC. For example, in one embodiment, a QCC that is contributed from an external contributor or a local contributor, is first optimized (or further optimized) using a local optimizing transpiler in the data processing environment where library 300 is maintained. The optimized (or further optimized) form of the contributed QCC is then stored as QCC 306 in library element 302.

Metadata 304 is a data structure that comprises sub-data structures in the form of parameters 308, 310, 312, 314, 316. Any parameter in metadata 304, e.g., parameter 312 as depicted, can exist as a plurality of instances or as a singular instance of that parameter. Parameter 308 holds the logical or computational functionality data as described herein. Parameter 310 holds the circuit specification data as described herein. Parameter 312 holds the data of one or more figures of merit as described herein. Parameter 314 holds the classical hardness score as described herein. Parameter 316 holds the quantum hardness score as described herein.

Figure 4:
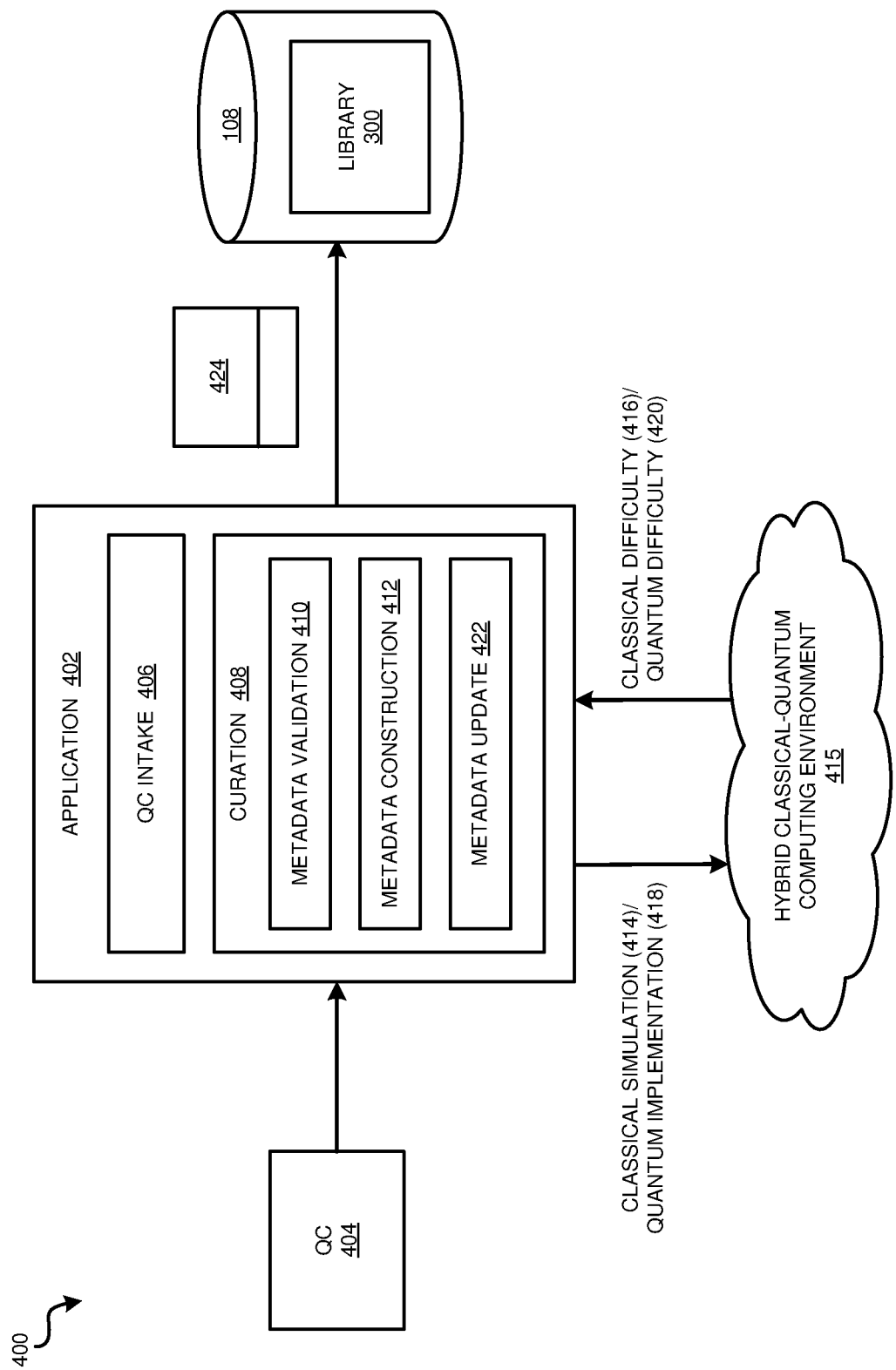
FIG. 4 depicts a block diagram of an example configuration of an application for building and delivering quantum circuits as a service in accordance with an illustrative embodiment.

With reference to FIG. 4, this figure depicts a block diagram of an example configuration of an application for building and delivering quantum circuits as a service in accordance with an illustrative embodiment. In the illustrative embodiment, configuration 400 includes application 402. Application 402 is an example of application 105 in FIG. 1, depicting the library creation, management, and curation functionalities contemplated in the illustrative embodiments.

Application 402 receives input 404. Input 404 may be an entire QC, as the non-limiting depiction shows, or may be a portion of a QC, to wit, a QCC as described herein. Component 406 accepts input 404 and preprocesses the QC from the input, e.g., by (further) optimizing the QC, partitioning the QC into one or more constituent QCCs, or some combination of these and other operations to prepare input 404 for admission into library 300.

Curation component 408 performs one or more functions to prepare the metadata for the one or more QCCs prepared by component 406. For example, if input 404 was supplied with information about the input QC, subcomponent 410 validates the information, segments the information into portions corresponding to the QCCs formed by component 406 (when applicable), maps the validated information to metadata parameters, or some combination thereof.

When input 404 is not accompanied by such information, and in some cases when the accompanying information is insufficient, subcomponent 412 constructs the metadata parameters. For example, subcomponent 412 may start (or cause to be started) a classical simulation (414) on classical-only or hybrid data processing environment 415 and obtain classical difficulty measurement (416) as shown. Subcomponent 412 transforms classical hardness measurement into a classical hardness score and stores the score in a metadata parameter as described herein. Similarly, subcomponent 412 may start (or cause to be started) a quantum implementation (418) on quantum-only or hybrid data processing environment 415 and obtain quantum difficulty measurement (420) as shown. Subcomponent 412 transforms quantum hardness measurement into a quantum hardness score and stores the score in a metadata parameter as described herein.

If a QCC, whose metadata is created by subcomponent 412 already exists in library 300, subcomponent 422 updates the existing library element corresponding to the QCC with the constructed metadata. If the QCC does not already exists in library 300, subcomponent 422 constructs a new library element corresponding to the QCC with the constructed metadata.

Component 408 sends the QCC and the metadata as library element 424 to be stored in library 300. In one embodiment, storing of library element 424 also causes an existing library element to be deleted, replaced, or overwritten.

Figure 5:
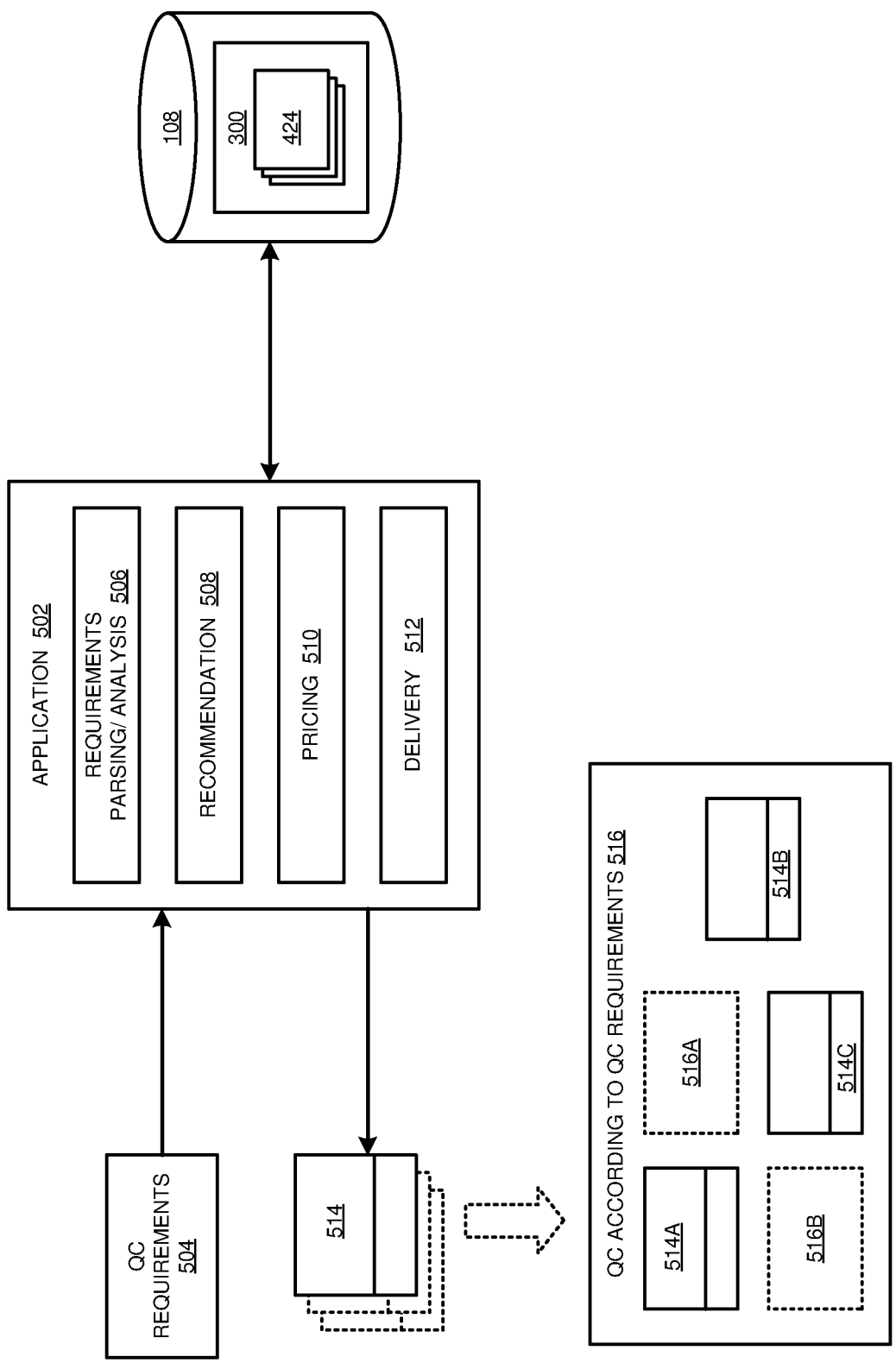
FIG. 5 depicts a block diagram of reusing a QCC from a curated library in quantum circuits as a service in accordance with an illustrative embodiment.

With reference to FIG. 5, this figure depicts a block diagram of reusing a QCC from a curated library in quantum circuits as a service in accordance with an illustrative embodiment. Application 502 is an example of application 105 in FIG. 1, depicting the library utilization, search, and retrieval functionalities contemplated in the illustrative embodiments.

Application 502 receives request 504, which includes a set of requirements for a QC being constructed. In a manner described herein, component 506 parses or otherwise analyzes the QC requirements, to determine which parameters to use in a search of library 300, where a plurality of library elements such as library element 424 are stored. Using the identified parameters, component 506 searches library 300 to find a set of library elements whose parameters match (within a tolerance) the parameter values derived from QC requirements 504.

Component 508 constructs a result set of recommended QCCs from the set of library elements returned by library 300. If any pricing information is to be associated with any of the QCCs in the recommendation list, component 510 associates the pricing information with those QCCs. Component 512 delivers the recommended QCCs and any associated pricing information as output 514. In one embodiment, output 514 comprises the QCCs and some or all of their corresponding metadata parameters.

A receiver of output 514, e.g. a compiler compiling the QC according to QC requirements 504, is then enabled to use one or more QCCs from output 514 in constructing QC 516 according to QC requirement 504. For example, QCC 514A, 514B and 514C may be used in conjunction with other components 516A and 516B to construct QC 516.

Figure 6:
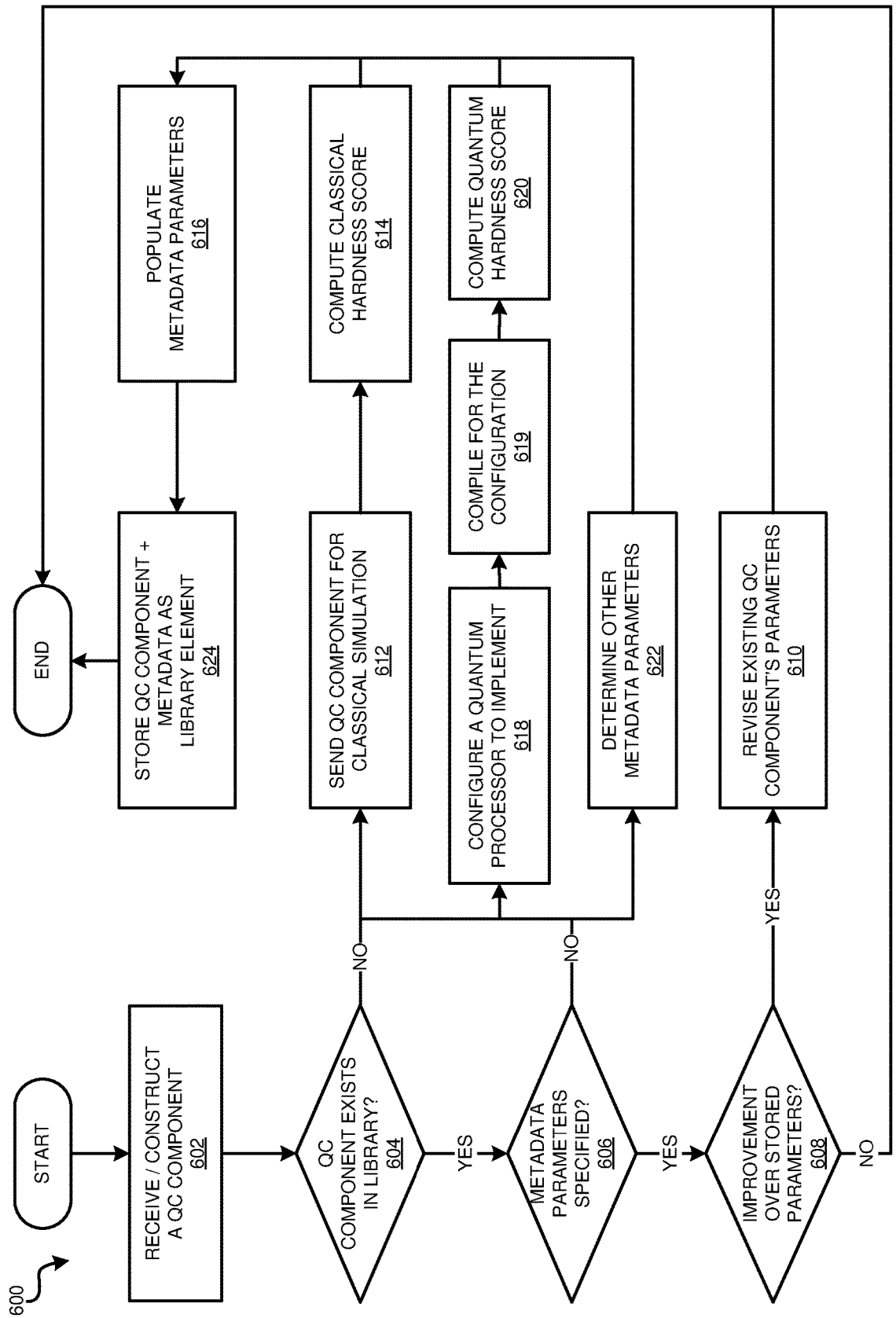
FIG. 6 depicts a flowchart of an example process for providing quantum circuits as a service in accordance with an illustrative embodiment.

With reference to FIG. 6, this figure depicts a flowchart of an example process for providing quantum circuits as a service in accordance with an illustrative embodiment. Process 600 can be implemented in application 402 of FIG. 4.

The application receives or constructs a QCC (block 602). The application determines whether the QCC exists in the library (block 604). If the QCC exists ("Yes" path of block 604), the application determines whether a specified minimum set of metadata parameters is specified with the QCC that has been received or constructed (block 606). If a specified minimum set of metadata parameters is specified with the QCC ("Yes" path of block 606), the application determines whether the value at least one parameter in the specified metadata improves a corresponding value of the corresponding parameter of the existing QCC in the library (block 608). If there is an improvement over the existing value ("Yes" path of block 608), the application revises the existing QCC's parameter(s) (block 610). The application ends process 600 thereafter. If there is no improvement over the existing value ("No" path of block 608), the application ends process 600 thereafter as well. In one embodiment, the application adds a newer version of the existing QCC to the library instead of overwriting or revising the existing QCC in the library.

If the QCC does not already exist in the library ("No" path of block 604), or if a specified minimum set of metadata parameters is not specified with the QCC ("No" path of block 606), the application performs one or more of the following paths of process 600—

A. The application sends the QCC for classical simulation (block 612). The application obtains a classical difficulty measurement from the simulation and computes a classical hardness score (block 614). The application then either proceeds to block 616 or to one or more of the other paths B and C.

B. The application configures a quantum hardware, e.g., one or more q-processors for implementing the QCC and sends the QCC for quantum implementation (block 618). The application also either simultaneously with block 618 or sequentially before or after block 618 compiles/optimizes/or otherwise reduces the complexity of the QCC for implementing on the configured quantum hardware (block 619). The application obtains a quantum difficulty measurement from the implementation and computes a quantum hardness score (block 620). The application then either proceeds to block 616 or to one or more of the other paths A and C.

C. The application computes or otherwise determines one or more of the metadata parameter values as described herein (block 622). The application then either proceeds to block 616 or to one or more of the other paths A and B.

At block 616, the application populates the metadata parameters of the QCC. The application stores the QCC and the associated metadata as a library element in the library (block 624). The application ends process 600 thereafter.

Thus, a computer implemented method, system or apparatus, and computer program product are provided in the illustrative embodiments for modular quantum circuit transformation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS), or in a QCaaS model which is delivered in a similar manner, is contemplated within the scope of the illustrative embodiments. In a SaaS or QCaaS model, the capability of the application implementing an embodiment is provided to a user by executing the application in a cloud infrastructure. The user can access the application using a variety of client devices through a thin client interface such as a web browser (e.g., web-based e-mail), or other lightweight client-applications. The user does not manage or control the underlying cloud infrastructure including the network, servers, operating systems, or the storage of the cloud infrastructure. In some cases, the user may not even manage or control the capabilities of the SaaS or QCaaS application. In some other cases, the SaaS or QCaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method comprising:
configuring, in a hybrid data processing environment comprising a classical computing system and a quantum computing system, a repository to hold a plurality of quantum circuit components (QCC(s));
transforming a received QCC into a library element in the repository, the library element comprising:
a classical hardness score corresponding to a degree of difficulty in simulating the received QCC in the classical computing system;
a quantum hardness score corresponding to a degree of difficulty in implementing the received QCC in the quantum computing system; and
adding the library element to the repository.

2. The method of claim 1, further comprising:
simulating the received QCC in the classical computing system, the simulating producing the degree of difficulty in simulating the received QCC.

3. The method of claim 1, further comprising:
receiving a quantum circuit (QC); and
partitioning the QC into a set of QCCs, the received QCC being a member of the set of QCCs.

4. The method of claim 3, further comprising:
receiving descriptive information in conjunction with the QC, the descriptive information comprising a contributor's degree of difficulty in simulating the QC in a contributor's classical system, and wherein the contributor's degree of difficulty is used as the degree of difficulty in simulating the received QCC in the classical computing system.

5. The method of claim 3, further comprising:
receiving descriptive information in conjunction with the QC, the descriptive information comprising a contributor's degree of difficulty in simulating the QC in a contributor's classical system; and
validating the contributor's degree of difficulty by simulating the QC in the classical computing system, and wherein the degree of difficulty in simulating the received QCC in the classical computing system overrides the contributor's degree of difficulty.

6. The method of claim 3, further comprising:
receiving descriptive information in conjunction with the QC, the descriptive information comprising a contributor's degree of difficulty in implementing the QC in a contributor's quantum system, and wherein the contributor's degree of difficulty is used as the degree of difficulty in implementing the received QCC in the quantum computing system.

7. The method of claim 3, further comprising:
receiving descriptive information in conjunction with the QC, the descriptive information comprising a contributor's degree of difficulty in implementing the QC in a contributor's quantum system; and
validating the contributor's degree of difficulty by implementing the QCC in the quantum computing system, and wherein the degree of difficulty in implementing the received QCC in the quantum computing system overrides the contributor's degree of difficulty.

8. The method of claim 1, further comprising:
implementing the received QCC in the quantum computing system, the implementing producing the degree of difficulty in implementing the received QCC.

9. The method of claim 1, further comprising:
associating with the received QCC, a metadata data structure, the metadata data structure comprising a plurality of parameters, the plurality of parameters including a first parameter storing the classical hardness score and a second parameter storing the quantum hardness score.

10. The method of claim 9, wherein the metadata data structure comprises a plurality of instances of a third parameter, each instance of the third parameter being a new data structure.

11. The method of claim 1, wherein the library element further comprises a value corresponding to a computational functionality implemented by the received QCC.

12. The method of claim 11, wherein the computational functionality is described as a graph, the value comprising a set of vertices and angles between pairs of vertices.

13. The method of claim 1, wherein the library element further comprises a value corresponding to a circuit specification of the received QCC.

14. The method of claim 13, wherein the circuit specification is specified in a quantum assembly language (QASM).

15. The method of claim 1, wherein the library element further comprises a figure of merit of the received QCC.

16. The method of claim 15, wherein the figure of merit is a gate count of the received QCC.

17. The method of claim 16, wherein the figure of merit comprises an expected gate count at runtime of the received QCC.

18. The method of claim 16, wherein the figure of merit is a circuit depth of the received QCC.

19. The method of claim 16, wherein the figure of merit an expected circuit depth at runtime of the received QCC.

20. The method of claim 1, further comprising:
optimizing the received QCC, as a part of transforming the received QCC, to form an optimized QCC, wherein the library element comprises the optimized QCC, wherein the classical hardness score corresponding to the received QCC is a classical hardness score corresponding to the optimized QCC, and wherein the classical hardness score corresponding to the received QCC is a classical hardness score corresponding to the optimized QCC.

21. The method of claim 1, wherein the adding causes one operation from a set of operations, the set of operations comprising (i) an older version of the library element is deleted, (ii) the older version of the library element is overwritten, and (iii) the older version of the library element is preserved and the library element is added as a new version of the older library element.

22. A computer usable program product comprising one or more non-transitory computer-readable storage media, and program instructions stored on at least one of the one or more storage media, the stored program instructions comprising:
   program instructions to configure, in a hybrid data processing environment comprising a classical computing system and a quantum computing system, a repository to hold a plurality of quantum circuit components (QCC(s));
   program instructions to transform a received QCC into a library element in the repository, the library element comprising:
      a classical hardness score corresponding to a degree of difficulty in simulating the received QCC in the classical computing system;
      a quantum hardness score corresponding to a degree of difficulty in implementing the received QCC in the quantum computing system; and
   program instructions to add the library element to the repository.

23. The computer usable program product of claim 22, wherein the computer usable code is stored in a non-transitory computer readable storage device in a data processing system, and wherein the computer usable code is transferred over a network from a remote data processing system.

24. The computer usable program product of claim 22 wherein the computer usable code is stored in a non-transitory computer readable storage device in a server data processing system, and wherein the computer usable code is accessed over a network to a remote data processing system for use in a computer readable storage device associated with the remote data processing system, further comprising:
   program instructions to meter use of the computer usable code associated with a request; and
   program instructions to generate an invoice based on the metered use.

25. A computer system comprising one or more processors, one or more computer-readable memories, and one or more non-transitory computer-readable storage devices, and program instructions stored on at least one of the one or more non-transitory storage devices for execution by at least one of the one or more processors via at least one of the one or more memories, the stored program instructions comprising:
   program instructions to configure, in a hybrid data processing environment comprising a classical computing system and a quantum computing system, a repository to hold a plurality of quantum circuit components (QCC(s));
   program instructions to transform a received QCC into a library element in the repository, the library element comprising:
      a classical hardness score corresponding to a degree of difficulty in simulating the received QCC in the classical computing system;
      a quantum hardness score corresponding to a degree of difficulty in implementing the received QCC in the quantum computing system; and
   program instructions to add the library element to the repository.

* * * * *